United States Patent Office 2,770,538
Patented Nov. 13, 1956

2,770,538
LIQUID FERTILIZERS

Donald E. Vierling, Pittsburgh, Pa.

No Drawing. Application August 11, 1954,
Serial No. 449,247

2 Claims. (Cl. 71—29)

This invention relates to compositions of matter which are intended to assist plant growth, and more particularly to liquid fertilizers.

It is, of course, well known that nitrogen (N), phosphoric pentoxide ($P_2O_5$), and potassium oxide ($K_2O$) are nutrients to plant life, and such have, for many years, been widely used in dry fertilizers. More recently, these nutrients have become available in fertilizers which are furnished to the trade in liquid form, usually as a concentrate for subsequent dilution in water.

Recent surveys show that most users of water soluble fertilizers much prefer that it be furnished to them in liquid form, thereby eliminating any necessity for their having to make up solutions from solid particulate form, with its attendant disadvantages. Furthermore, it has been found that users of liquid fertilizers prefer high concentrations of nutrients to minimize shipping and container costs. In addition, they prefer that there be no crystallization of the liquid fertilizer above water-freezing temperature (i. e., 32° F.) in order that there be a true solution with no crystals or undissolved particles to contend with, as these render spraying decidedly more difficult, actually lower the nutrient content of the liquid, etc.

It is, accordingly, one of the objectives of the present invention to provide a much improved liquid fertilizer which may be furnished to the trade in liquid form, and containing at least 40% by weight nutrients and having a crystallization point no higher than 32° F.

I have further discovered that liquid fertilizers made from free ammonia, urea, phosphoric acid, potassium hydroxide and nitric acid have numerous advantages from both the use and the manufacturing standpoints; and, when supplemented by a wetting agent in effective quantities, they are absorbed by the plants in tremendously increased manner, thereby practically eliminating any possibility of leeching, evaporation or any other form of loss. Therefore, to all intents and purposes, the plant obtains the complete value of the nutrients of the improved liquid fertilizer of the present invention.

Referring to the manufacturing standpoint, I have further discovered that, when liquid fertilizers are made from urea, anhydrous ammonia, phosphoric acid, potassium hydroxide and nitric acid, and employing the following procedure, they contain at least 40% by weight nutrients (N, $P_2O_5$ and $K_2O$ in various ratios); they have a crystallization point no higher than 32° F.; they are much cheaper to manufacture than are liquid fertilizers made by standard procedures now in common use, or any other procedure now known to me; and also that, when so manufactured, they have decided insecticidal value:

1. Add water to obtain the desired solutions; for example, approximately 28% by weight of water is employed to obtain a 10-20-10 liquid fertilizer.

2. Add KOH to the water to obtain desired percent of $K_2O$ in the final composition; for example 10% $K_2O$ by weight.

3. Add $H_3PO_4$ to obtain the desired percent of $P_2O_5$; for example, 20% $P_2O_5$ by weight.

4. Neutralize $H_3PO_4$ with $NH_3$ by bubbling the $NH_3$ into the aqueous solution; or, as an alternative, prepare the desired aqueous ammonia solution and add it to the acid solution.

5. Add sufficient $NH_2CONH_2$ (urea) to the above to provide at least 5% by weight N in the final composition. If desired, $NH_2CONH_2$ may be added to provide the balance of the N to make a total of at least 10% N.

6. Add the desired nitrogen content (considering the nitrogen already added by the $NH_3$ to neutralize the $H_3PO_4$ and the 5% N or more obtained from $NH_2CONH_2$)

by adding equal molecular weights of $NH_3$ (bubbling it in) and $HNO_3$ to obtain the desired percent of nitrogen; example, 10% by weight.

7. Add effective quantities of a standard wetting agent; for example, 0.50% by weight.

8. Add the following desired trace elements:

| Manganese sulphate | Iodine monobromide |
| Boric acid | Iron sulphate |
| Copper sulphate | Sodium molybdate |
| Zinc sulphate | Magnesium sulphate |
| Cobalt sulphate | Calcium sulphate |

Other water soluble trace elements may, of source, be used to supply various soil deficiencies.

The aforementioned standard wetting, or surface active, agent may be selected from the anionic or nonionic, the following ones having proved to be effective in obtaining the benefits of the teachings of the present invention:

| Ultra wet | Triton X-100 |
| Santomeres | Triethanolamine |
| Naconal | Super wet LD |
| Oronite D-40 | Dupanel |

From the foregoing, it is believed manifest that a number of water soluble compounds will provide the nutrient solutions.

The present invention contemplates nitrogen (N), phosphoric pentoxide ($P_2O_5$) and potassium oxide ($K_2O$) in various weight ratios, such as 10-20-10; of completely water soluble nutrients at least 40% by weight; and the wetting, or surface active, agent (for example, Ultra Wet) present to the extent of ten pounds per ton of liquid fertilizer.

It is recognized that small quantities of wetting agents have heretofore been used in dry fertilizers to prevent caking, decrease the drying time, etc. However, the liquid fertilizer of the present invention contemplates the presence of a wetting agent to a vastly greater extent, and, in any event, not less than ¼ % in the mixture as applied to the plants, its purpose being to enable the immediate absorption of the nutrients and other chemicals by the plant, as previously stated.

The anhydrous or aqueous ammonia provides the nitrogen in a readily available form so that it can be used direct, or is easily converted by the plant to the nitride, and used as a plant nutrient.

The liquid fertilizer of the present invention has been found to serve as a very effective vehicle for additional water soluble agricultural chemicals generally used in agriculture, such as weed killer, soil conditioners, sequestering agents, insecticides, fungicides, vitamins, penicillin, anti-biotics, and growth stimulating hormones.

In hard water areas, some difficulty with the solubility of certain of the agricultural chemicals might be expected. However, I have discovered that, along with the wetting agent, and preferably in equal proportions there-with to obtain the aforementioned total percentages, any one of the well known sequestering agents (for example, of the polyphosphate variety) not only improves solubility, but actually aids in improved biological activity.

The present application is a continuation-in-part of my patent application Serial No. 362,943.

While I have shown and described certain specific embodiments of the present invention, it will be readily understood that I do not wish to be limited exactly thereto, since various modifications may be made without departing from the scope of the invention as defined in the appended claims.

I claim:

1. The method of manufacturing a liquid fertilizer which comprises adding to water sufficient potassium hydroxide to obtain the desired percentage of potassium oxide, adding sufficient phosphoric acid to obtain the desired percentage of phosphorous pentoxide, neutralizing the phosphoric acid with ammonia and adding sufficient urea to provide the desired amount of organic nitrogen, said organic nitrogen avoiding fast assimilation of nitrogen.

2. The method of manufacturing a liquid fertilizer which comprises adding to water sufficient potassium hydrixoide to obtain the desired percentage of potassium oxide, adding sufficient phosphoric acid to obtain the desired percentage of phosphorus pentoxide, neutralizing the phosphoric acid with ammonia, adding sufficient urea to provide the desired amount of organic nitrogen, said organic nitrogen avoiding fast assimilation of nitrogen, and adding equal molecular weights of ammonia and nitric acid to obtain the desired total percentage of nitrogen.

References Cited in the file of this patent

UNITED STATES PATENTS

| Number | Name | Date |
|---|---|---|
| 1,950,068 | Spangenberg | Mar. 6, 1934 |
| 2,036,870 | Harvey | Apr. 7, 1936 |
| 2,102,830 | Brill | Dec. 21, 1937 |
| 2,255,027 | Keenen | Sept. 2, 1941 |
| 2,279,200 | Keenen | Apr. 7, 1942 |
| 2,314,091 | Jones | Mar. 16, 1943 |
| 2,350,982 | Borst | June 13, 1944 |